(12) United States Patent
Wang

(10) Patent No.: US 7,850,352 B2
(45) Date of Patent: *Dec. 14, 2010

(54) FLAGPOLE LAMP OF A VEHICLE HEAD

(76) Inventor: Ming-Cheng Wang, P.O. Box 90, Tainan City 70499 (TW)

( * ) Notice: Subject to any disclaimer, the term of this patent is extended or adjusted under 35 U.S.C. 154(b) by 184 days.

This patent is subject to a terminal disclaimer.

(21) Appl. No.: 12/035,447

(22) Filed: Feb. 22, 2008

(65) Prior Publication Data

US 2009/0213611 A1 Aug. 27, 2009

(51) Int. Cl.
*B60Q 1/26* (2006.01)
*A45B 3/02* (2006.01)

(52) U.S. Cl. ...................... 362/540; 362/543; 362/545; 362/102; 362/231

(58) Field of Classification Search ................. 362/473, 362/484, 485, 505, 506, 511, 540–542, 545, 362/102, 118, 231, 414, 431
See application file for complete search history.

(56) References Cited

U.S. PATENT DOCUMENTS 7,517,106 B1 * 4/2009 Wang ......................... 362/102

* cited by examiner

*Primary Examiner*—Ismael Negron

(57) ABSTRACT

A flagpole lamp includes a pole, a socket joint, a circuit board, a positioning base, a waterproof washer, a lucent bar and a pole head. The circuit board, the positioning base and the waterproof washer are fitted in the socket joint. The circuit board has a light disposed through in the positioning base and the waterproof washer respectively. The lucent bar is coupled to the socket joint at one end, and the pole head put at the opposite end. The light of the circuit board can be lit up to emit light out of the lucent bar to enable a driver to clearly see the head corners and the position of the vehicle.

4 Claims, 4 Drawing Sheets

FLAGPOLE LAMP OF A VEHICLE HEAD

BACKGROUND OF THE INVENTION

1. Field of the Invention

This invention relates to a flagpole lamp of a vehicle head, particularly to one able to be brightened with a certain colored light to let a driver clearly see the corners and the position of a vehicle head while turning on headlights, and able to flash other colored light to apparently tell other drivers the intention of the driver while turning on directional lights, so as to step up traffic security.

2. Description of the Prior Art

Commonly, two sides of a vehicle's head are respectively installed with a conventional flagpole used for a driver to clearly see the corner and the position of a car's head to avoid accidental collisions. However, the conventional flagpole is usually made of metal, only used to indicate the width of the head and unable to be clearly seen in the night. Therefore, the conventional flagpole can not effectively play the role.

SUMMARY OF THE INVENTION

The objective of this invention is to offer a flagpole lamp of a vehicle head that can let a driver clearly see the corners and the position of a vehicle head by emitting a certain colored light at the same time while turning on headlights, and that can flash on-and off other colored light to apparently tell drivers of other cars running beside and behind the car the intension of the driver while turning on directional lights, so as to advance traffic security.

The main characteristics of the invention are a pole, a socket joint, a circuit board, a positioning base, a lucent bar and a pole head. The socket joint is fixed on the pole, provided with a big-diameter chamber formed in an upper portion, and a through hole formed in the bottom of the chamber. The circuit board is installed in the chamber of the socket joint, provided with at least a light and a power line. The positioning base is installed in the chamber of the socket joint to be fixed on the circuit board, provided with at least a through hole. The waterproof washer is also installed in the chamber of the socket joint for being fixed on the positioning base, provided with at least a through hole. The lucent bar is positioned on the socket joint, provided with a groove formed at its bottom, and a hole formed inside it. The pole head is positioned on the lucent bar.

BRIEF DESCRIPTION OF DRAWINGS

This invention is better understood by referring to the accompanying drawings, wherein.

DETAILED DESCRIPTION OF THE PREFERRED EMBODIMENT

Figure 1:
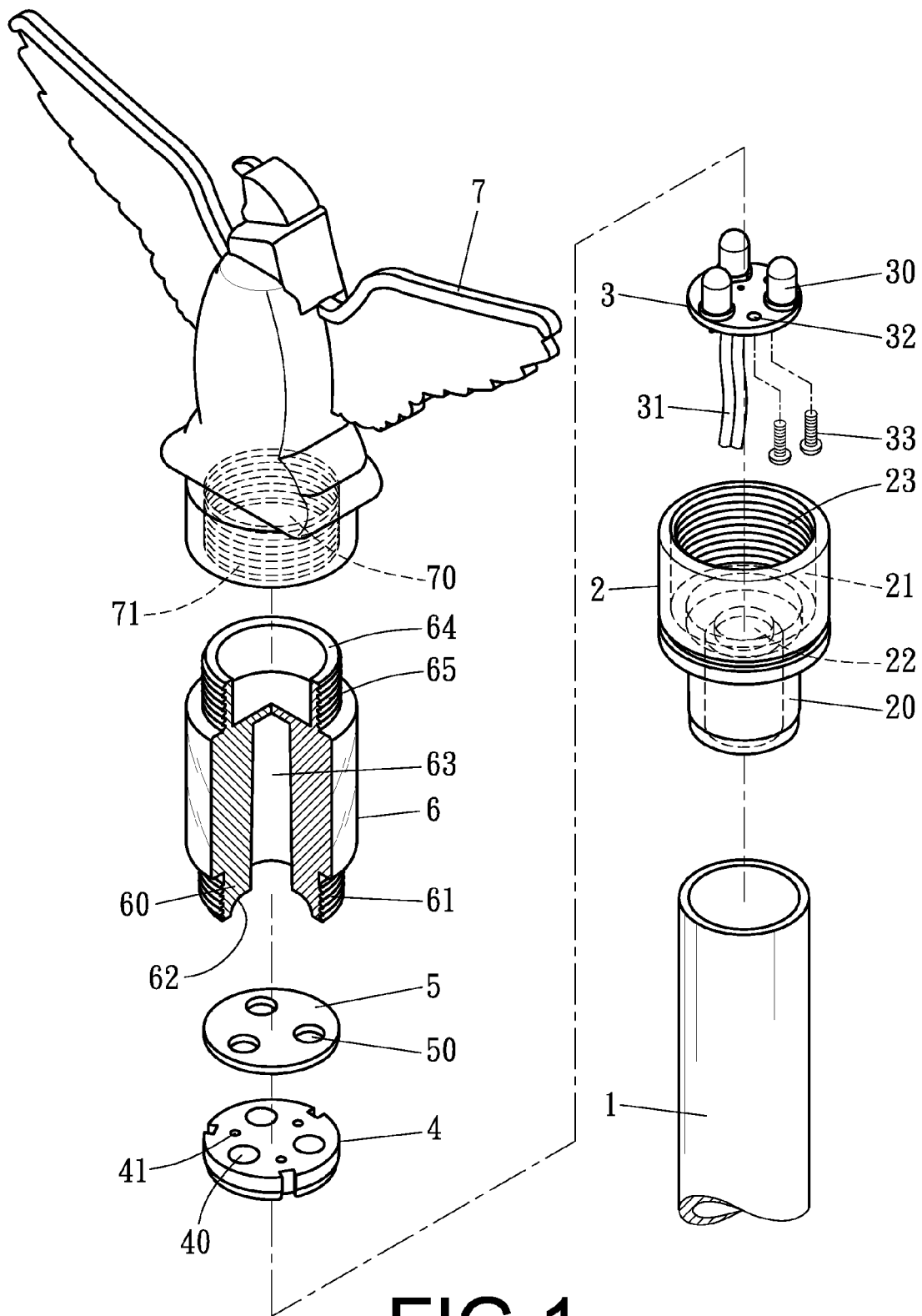
FIG. 1 is an exploded perspective view of a preferred embodiment of a flagpole lamp of a vehicle head in the present invention.
Figure 2:
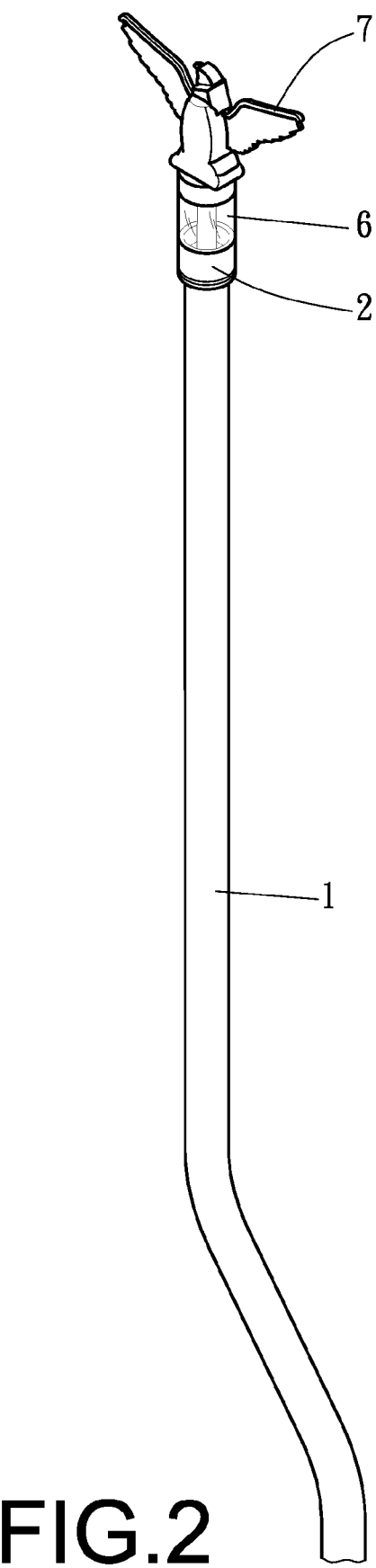
FIG. 2 is a perspective view of the preferred embodiment of a flagpole lamp of a vehicle head in the present invention.
Figure 3:
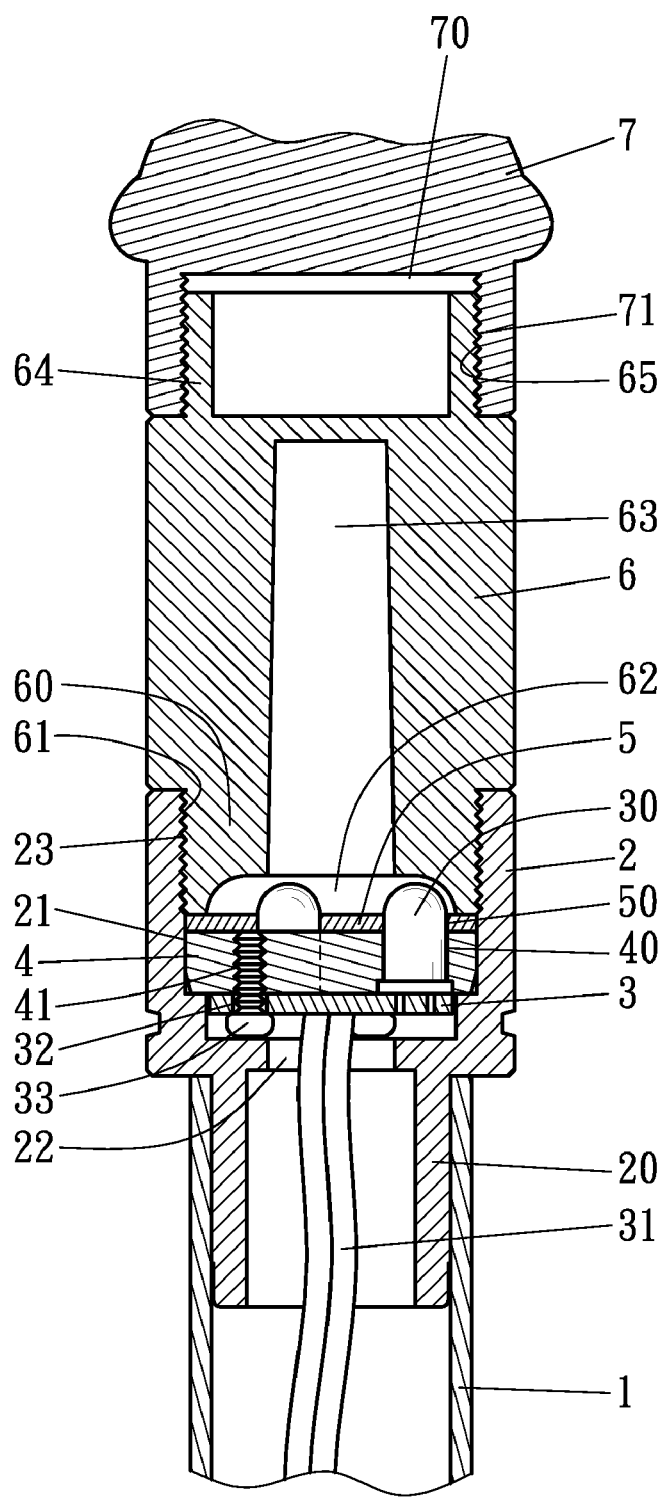
FIG. 3 is a cross-sectional view of the preferred embodiment of a flagpole lamp of a vehicle head in the present invention.

As shown in FIGS. 1-3, a preferred embodiment of a flagpole lamp of a vehicle head in the present invention consists of a pole 1, a socket joint 2, a circuit board 3, a positioning base 4, a waterproof washer 5, a lucent bar 6 and a pole head 7.

The pole 1 is made of a tube.

The socket joint 2 is fixed on the pole 1, provided with a small-diameter portion 20 formed in a lower portion, a big-diameter chamber 21 formed on the small-diameter portion 20, a through hole 22 formed in the bottom of the chamber 21, and female threads 24 formed around the inner wall of the chamber 21.

The circuit board 3 is installed in the chamber 21 of the socket joint 2, provided with at least three lights 30 (LEDs) able to shift lighting color, a power line 31, at least a through hole 32 for being inserted with a screw 33.

The positioning base 4 is fitted inside the chamber 21 of the socket joint 2, positioned above the circuit board 3, provided with at least a through hole 40 and at least a threaded hole 41.

The waterproof washer 5 is installed in the chamber 21 of the socket joint 2 and above the positioning base 4, provided with at least a through hole 50.

The lucent bar 6 is connected to the connecting member 2, provided with a lower portion 60 formed at its bottom, male threads 61 formed around the outer surface of the lower portion 60, a groove 62 formed in the bottom of the lower projection 60, a central hole 63 formed to communicate with the groove 62, an upper portion 64 formed at its top, and male threads 65 formed around the exterior surface of the upper portion 64.

The pole head 7 is positioned on the lucent bar 6, made of opaque material with a design such as an eagle, and provided with a recess 70 formed inside its bottom and female threads 71 formed around the interior surface of the recess 70.

In assembly, as shown in FIGS. 1~3, the circuit board 3 is first positioned under the positioning base 4, with the light 30 of the circuit board 3 inserted upward through and located in the through hole 40 of the positioning base 4, and with the screw 33 inserted through the through hole 32 of the circuit board 3 for being fixed in the threaded hole 41 of the positioning base 4. Next, put the circuit board 3 and the positioning base 4 into the chamber 21 of the socket joint 2, enabling the power line 31 of the circuit board 3 to pass through the through hole 22 of the socket joint 2. Then the waterproof washer 5 is successively fitted in the chamber 21 for being fixed on the positioning base 4, with the light 30 of the circuit board 3 protruding up the through hole 50 of the waterproof washer 5. Then, put the lucent bar 6 on the connecting member 2 to start screwing the male threads 61 of the lucent bar 6 with the female threads 23 of the connecting member 2 until the waterproof washer 5 is tightly pressed by the bottom of the lucent bar 6. By the time, the top of the light 30 is enclosed in the groove 62 of the lucent bar 6. Subsequently, the pole head 7 is positioned on the lucent bar 6, having the female threads 71 engaged with the male threads 65 of the lucent bar 6. Finally, plug the small-diameter portion 20 of the socket joint 2 into the pole 1 to finish the whole assembly of the flagpole.

Figure 4:
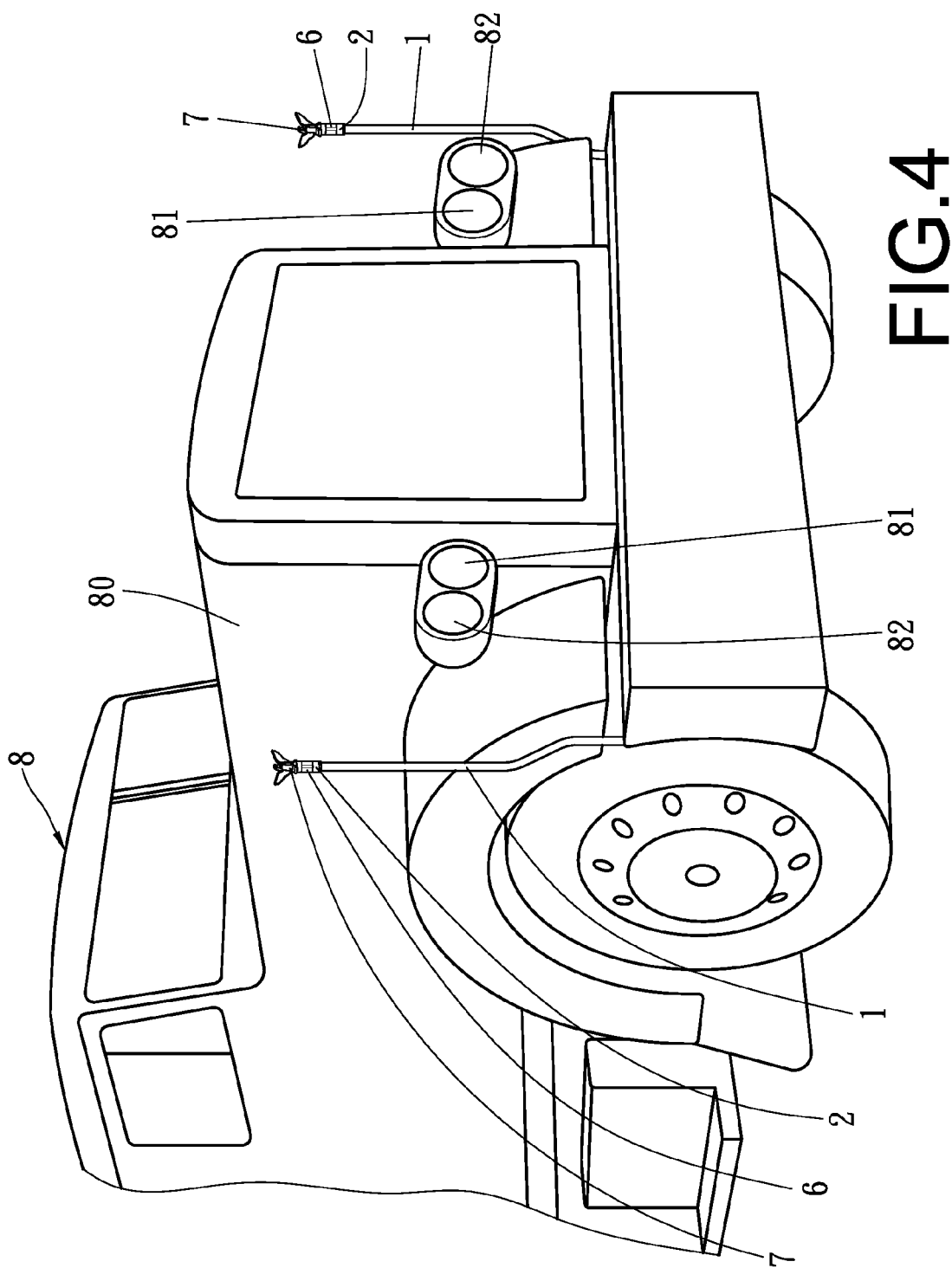
FIG. 4 is a perspective view of the preferred embodiment of a flagpole lamp of a vehicle head in the present invention, showing it being installed at two sides of a vehicle head.

In using, as shown in FIG. 4, the pole 1 is primarily positioned at two corners of a vehicle head 80 of a vehicle 8 respectively, with the power line 31 of the circuit board 3 connected to a light control circuit of the vehicle 8. When headlights 81, 82 (main ones or small ones) of the vehicle 8 is turned on in the night or in the dark, the light 30 in the chamber 21 of the socket joint 2 can simultaneously be turned on to emit colored light (such as blue one). Meanwhile, the light 30 is to shoot light toward the lucent bar 6 to be reflected with colored light, so as to enable the driver to clearly see the corners and the position of the vehicle head 80 to prevent any collisions from happening even if in the dark. Also, the pole head 7 is designed with a certain figure to make the pole 1 look aesthetic. Moreover, when a driver intends to make a turn with the directional lights turned on, the light 30 in the chamber 2 can be as well automatically lit to flash other colored light (such as orange one) out of the lucent bar 6 to attract attention of drivers of other cars running beside and behind the vehicle 8 for enhancing traffic security.

While the preferred embodiment of the invention has been described above, it will be recognized and understood that various modifications may be made therein and the appended claims are intended to cover all such modifications that may fall within the spirit and scope of the invention.

What is claimed is:

1. A flagpole lamp of a vehicle head comprising:

a pole;

a socket joint fixed on said pole and provided with a big-diameter chamber formed in an upper portion, a through hole formed in a bottom of said chamber;

a circuit board installed in said chamber of said socket joint and provided with at least a light and a power line connected to said circuit board;

a positioning base installed in said big-diameter chamber of said socket joint and fixed on said circuit board and provided with at least a through hole;

a waterproof washer installed in said chamber of said socket joint and fixed on said positioning base and provided with at least a through hole;

a lucent bar positioned on said socket joint and provided with a groove formed at its bottom, a hole formed inside said lucent bar; and a pole head positioned on said lucent bar.

2. The flagpole lamp of a vehicle head as claimed in claim 1, wherein said pole is formed tubular and said socket joint is provided with a lower small-diameter portion formed under said big-diameter chamber for plugging in an upper end of said pole.

3. The flagpole lamp of a vehicle head as claimed in claim 1, wherein said socket joint is provided with female threads formed around an interior wall of said chamber for being engaged with male threads formed around an exterior wall of a lower portion of said lucent bar, and said pole head is provided with a recess formed in its bottom having female threads formed around it to engage with male threads formed around an upper portion of said lucent bar.

4. The flagpole lamp of a vehicle head as claimed in claim 1, wherein said circuit board is provided with at least a through hole for a screw to pass through to engage with a threaded hole provided in said positioning base.

* * * * *